United States Patent [19]

Geretzki

[11] 4,213,388
[45] Jul. 22, 1980

[54] GEARING FOR DRIVING A PLATE CYLINDER OF A PRINTING PRESS AT A NON-UNIFORM SPEED

[75] Inventor: Helmut Geretzki, Lengerich, Fed. Rep. of Germany

[73] Assignee: Windmoller & Holscher, Lengerich, Fed. Rep. of Germany

[21] Appl. No.: 943,189

[22] Filed: Sep. 18, 1978

[30] Foreign Application Priority Data

Sep. 21, 1977 [DE] Fed. Rep. of Germany ... 7729287[U]

[51] Int. Cl.² ..................... B41F 5/00; F16H 35/02
[52] U.S. Cl. ....................................... 101/216; 74/393
[58] Field of Search ............... 101/216, 174, 212, 228, 101/232; 74/393, 394, 422, 431, 434

[56] References Cited

U.S. PATENT DOCUMENTS

| 2,790,384 | 4/1957 | Kaldschmidt | 101/216 |
| 2,924,172 | 2/1960 | Buttner | 74/393 X |
| 3,276,648 | 10/1966 | Lewis, Jr. et al. | 101/228 X |
| 3,489,084 | 1/1970 | Strickland et al. | 101/232 X |
| 3,742,244 | 6/1973 | Raible | 101/216 |
| 3,828,673 | 8/1974 | Gazzola et al. | 101/232 |

FOREIGN PATENT DOCUMENTS 958769 3/1950 France ................................. 101/216

*Primary Examiner*—E. H. Eickholt
*Attorney, Agent, or Firm*—Fleit & Jacobson

[57] ABSTRACT

The plate cylinder of a printing press is driven at a non-uniform speed to suit a particular repeat length of the web to be printed. If the repeat length is shorter or longer than the plate cylinder circumference, the plate cylinder is respectively accelerated or retarded from web speed between successive imprints by being connected to the output of differential gearing of which a first input is connected to a drive gear and a second input is connected to a gear oscillated by means of a cam follower of a cam rotating together with said drive gear.

6 Claims, 4 Drawing Figures

GEARING FOR DRIVING A PLATE CYLINDER OF A PRINTING PRESS AT A NON-UNIFORM SPEED

The innovation relates to gearing for driving a plate cylinder of a printing press at a non-uniform speed.

Webs of paper or plastics from which differently long sections are severed to produce packaging material must, for example, often be provided with imprints at larger spacings to characterise the contents to be packaged. These imprints should always be at the correct position independently of the length of the respective section.

It is therefore the problem of the innovation to provide gearing for driving a plate cylinder of a printing press, which can be converted in a simple manner to different repeat lengths of the web to be printed.

According to the innovation, this problem is solved in gearing of the aforementioned kind in that the plate cylinder is concentrically connected to a gear in mesh with an intermediate gear engaging a gear on the output shaft of differential gearing, that the input shaft of the differential gearing carries a gear in mesh with a drive gear on the shaft of which there is secured a cam plate, that a gear meshing with a longitudinally guided rack engages the gear forming the second input of the differential gearing, and that the rack carries at one end a cam roller which rolls on the cam plate. In the printing press equipped with gearing according to the innovation, the web to be printed passes through the printing press at a constant speed whereas the plate cylinder can assume different peripheral speeds. During printing, which can for example take place during half a revolution of the plate cylinder, the peripheral speed of the plate cylinder is always the same as the speed of the web. When the repeat length is less than the circumference of the plate cylinder, the latter is rhythmically accelerated and retarded over the peripheral region that is free from the printing form. With a larger repeat length, the plate cylinder is retarded and subsequently again accelerated to the speed of the web to be printed.

With the gearing according to the innovation, the plate cylinder can be driven in a simple manner at an irregular speed corresponding to the repeat lengths of the web to be printed.

The differential gearing can be differential bevel gearing or planet gearing.

In a further development of the innovation, the cam plate is replaceable for each length of the format to be printed.

Instead of the rack drive, the drive producing the irregularity can consist of an oscillatingly driven gear segment. In this case it is provided that the cam roller is mounted at the free end of a lever which is pivoted at a position fixed with respect to the frame and is articulated by way of a connecting rod to a lever connected to a gear segment, the length of the lever arm being selectable at will, and that the gear segment, which is mounted at its central rotary point on a pin fixed with respect to the frame, meshes with that gear which drives the carrier. By adjusting the lever arms, different format lengths can be achieved with the cam plate remaining the same.

Further advantageous constructions of the innnovation are described in more detail in the subsidiary claims.

Examples of the innovation will now be described in more detail with reference to the drawing, wherein.

Figure 1:
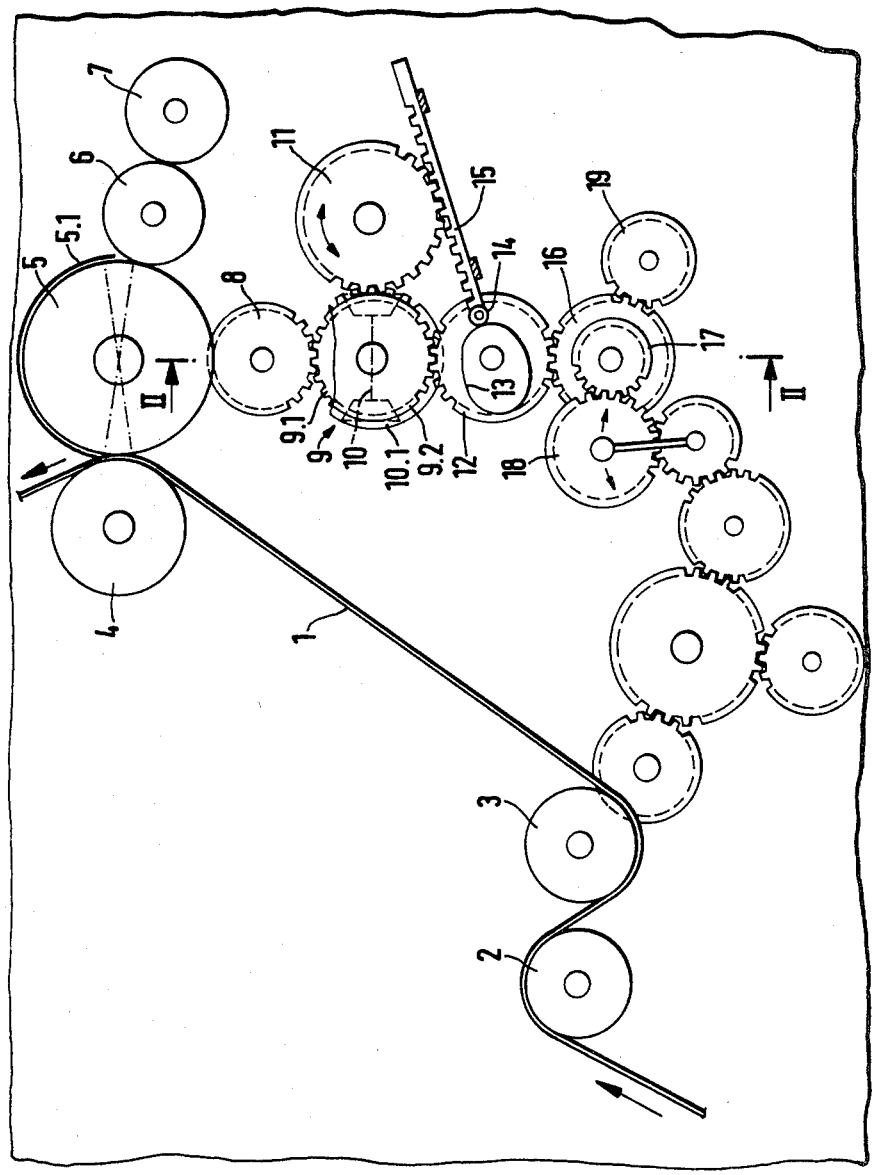
FIG. 1 is a diagrammatic side elevation of gearing non-uniformly driving the plate cylinder of a printing press.

A web 1, for example a tubular plastics web for producing shrink-on covers, is supplied by way of a pair of feed rollers 2, 3 to an impression cylinder 4 which co-operates with a plate cylinder 5. The printing type 5.1 is inked by a screen roller 6 which abuts an immersion roller 7 which dips in known manner into an ink trough (not shown). The rollers 6, 7 are driven by the plate cylinder 5.

The plate cylinder 5 is driven by way of an intermediate gear 8 by the output 9.1 of differential bevel gearing 9 of which the carrier 10 is connected to a spur gear 10.1 which can be set into oscillation by a spur gear 11. The input 9.2 of the differential bevel gearing 9 is in mesh with a spur gear 12 which is fixed to a cam plate 13. The cam plate is swept by a cam roller 14 which is freely rotatable on a rack 15 which is longitudinally displaceable in the frame of the press. The rack 15 engages the spur gear 11 and is biassed, for example under spring action, in a direction towards the cam plate such that the cam roller 14 always runs on the cam plate.

The spur gear 12 is driven by change gearing 16 to 18. The spur gear 18 can also be completely swung away from the spur gear 17. In that case the drive for the plate cylinder 5 is effected by a spur gear 19 that can be coupled to the main drive. The shape of the cam plate 13 is such that, during printing, the plate cylinder 5 will have a peripheral speed corresponding to the speed of the web 1 and during the other half rotation it is retarded or accelerated so that it will run faster or slower than the web. To change the repeat length, the cam plates 13 and the corresponding gears of the change gearing must be replaced.

Figure 2:
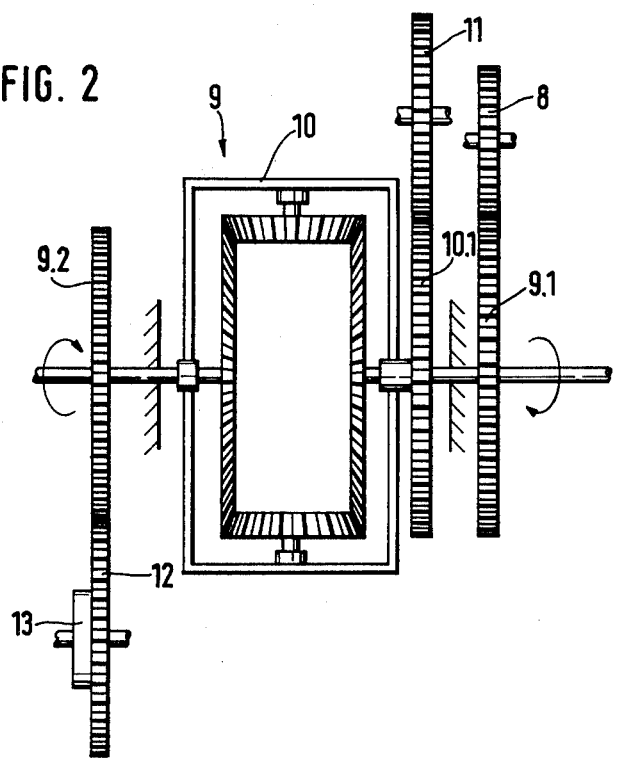
FIG. 2 is a diagrammatic section through the differential bevel gearing according to FIG. 1 taken on the line II—II.
Figure 3:
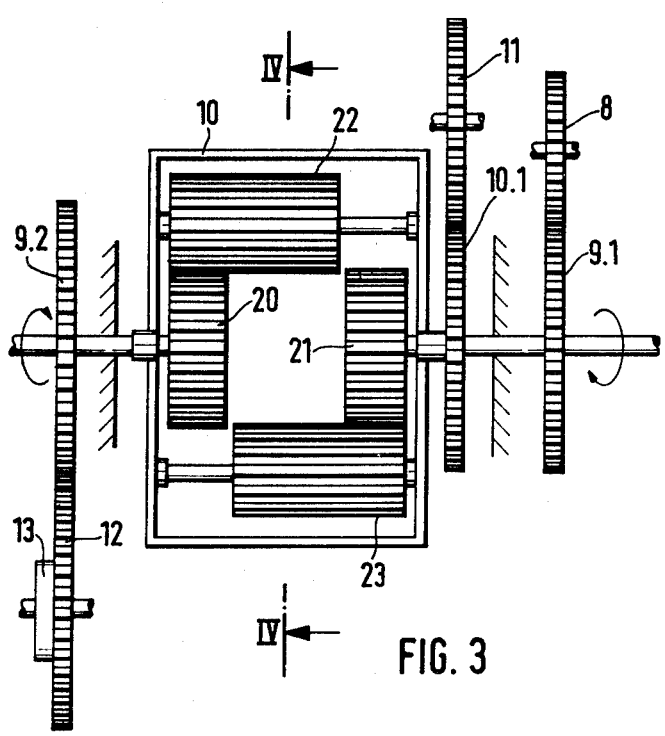
FIG. 3 is a representation corresponding to FIG. 2 of functionally equivalent planet gearing.
Figure 4:
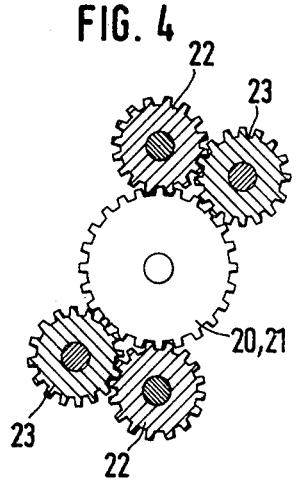
FIG. 4 is a diagrammatic section through the gearing of FIG. 3 taken on the line IV—IV.

The differential bevel gearing shown diagrammatically in FIGS. 1 and 2 can also be replaced by planet gearing illustrated in FIGS. 3 and 4. The two sun gears 20, 21 are of equal size. The sun gear 20 meshes with a planet gear 22, whilst the sun gear 21 meshes with a planet gear 23. The planet gears 22 and 23 interengage as will be evident from FIG. 4.

I claim;

1. Gearing for driving a plate cylinder of a printing press at a non-uniform speed, characterised in that the plate cylinder (5) is concentrically connected to a gear in mesh with an intermediate gear (8) engaging a gear (9.1) on the output shaft of differential gearing (9), that the input shaft of the differential gearing carries a gear (9.2) in mesh with a drive gear (12) on the shaft of which there is secured a cam plate (13), that a gear (11) meshing with a longitudinally guided rack (15) engages the gear (10.1) forming the second input of the differential gearing (9), and that the rack (15) carries at one end a cam roller (14) which rolls on the cam plate (13).

2. Gearing according to claim 1, characterised in that the differential gearing consists of differential bevel gearing which comprises bevel gears and differential pinions in mesh therewith and of which the output gear (28) connected to the output differential pinion (25) drives the plate cylinder (5) by way of the intermediate gear (8), that the carrier (10) of the differential pinions (26, 27) is connected to a spur gear (10.1) in mesh with a spur gear (11) engaging the rack (15), and that the cam roller (14) of the rack (15) runs on the cam plate (13) which is secured on a spur gear (12) engaging a gear (29) connected to the driving bevel gear (24).

3. Gearing according to claim 1, characterised in that the differential gearing consists of planet gearing which comprises sun gears (20, 21) and planet gears (22, 23) engaged therewith and of which the output gear (28) connected to the output sun gear (21) drives the plate cylinder by way of the intermediate gear (8), that the carrier (10) of the planet gears (22, 23) is connected to a spur gear (10.1) which engages the spur gear (11) in mesh with the rack (15), and that the cam roller (14) of the rack (15) runs on the cam plate (13) secured to a spur gear (12) engaging a gear (29) which is connected to the driving sun gear (24).

4. Gearing according to one of claims 1 to 3, characterised in that the cam plate (13) is exchangeable according to the format length to be printed.

5. Gearing according to one of claims 1 to 3, characterised in that the cam roller is mounted at the free end of a lever which is pivoted at a position fixed with respect to the frame and is articulated by way of a connecting rod to a lever connected to a gear segment, and that the gear segment, which is mounted at its central rotary point on a pin fixed with respect to the frame, meshes with that gear which drives the carrier of the differential gearing.

6. Gearing according to claim 4, characterised in that the cam roller is mounted at the free end of a lever which is pivoted at a position fixed with respect to the frame and is articulated by way of a connecting rod to a lever connected to a gear segment, and that the gear segment, which is mounted at its central rotary point on a pin fixed with respect to the frame, meshes with that gear which drives the carrier of the differential gearing.

* * * * *